Aug. 24, 1948.　　　　J. H. ROETHEL　　　　2,447,990
WINDOW GUIDE FOR VEHICLE BODIES
Filed Sept. 17, 1943　　　　　　　　　　2 Sheets-Sheet 1
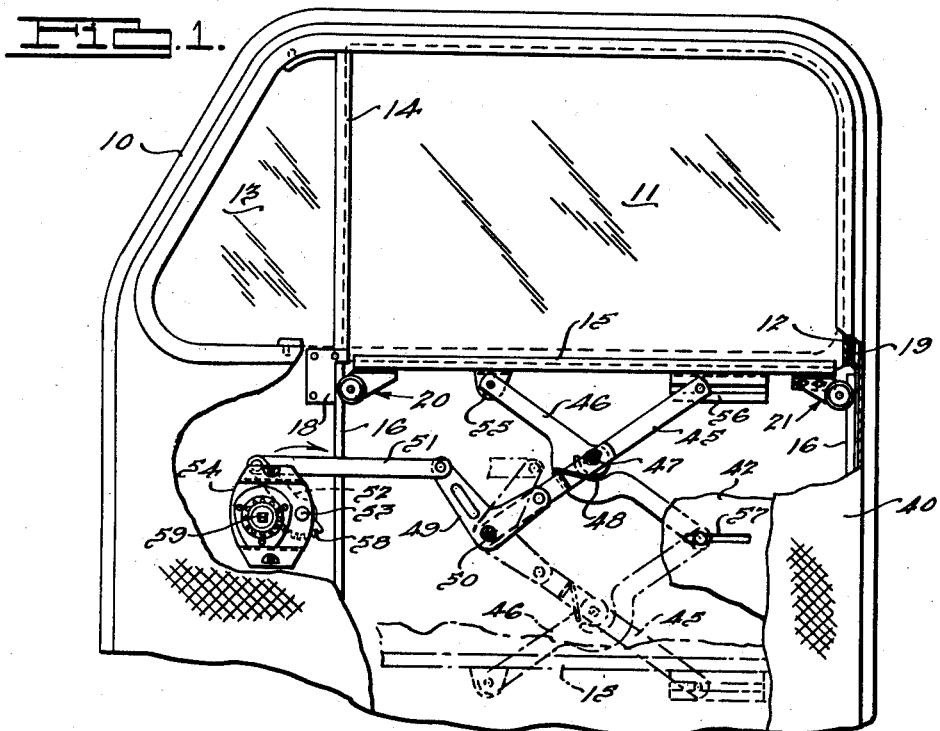
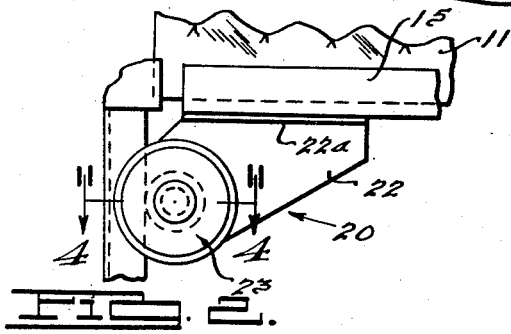
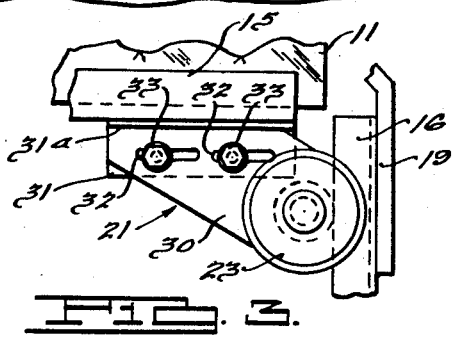
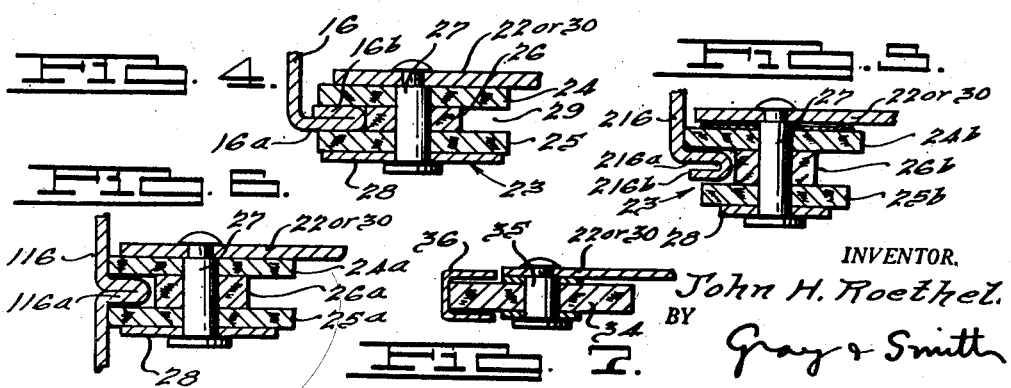
INVENTOR.
John H. Roethel.
BY
Gray & Smith
ATTORNEYS.

Aug. 24, 1948.   J. H. ROETHEL   2,447,990
WINDOW GUIDE FOR VEHICLE BODIES
Filed Sept. 17, 1943   2 Sheets-Sheet 2
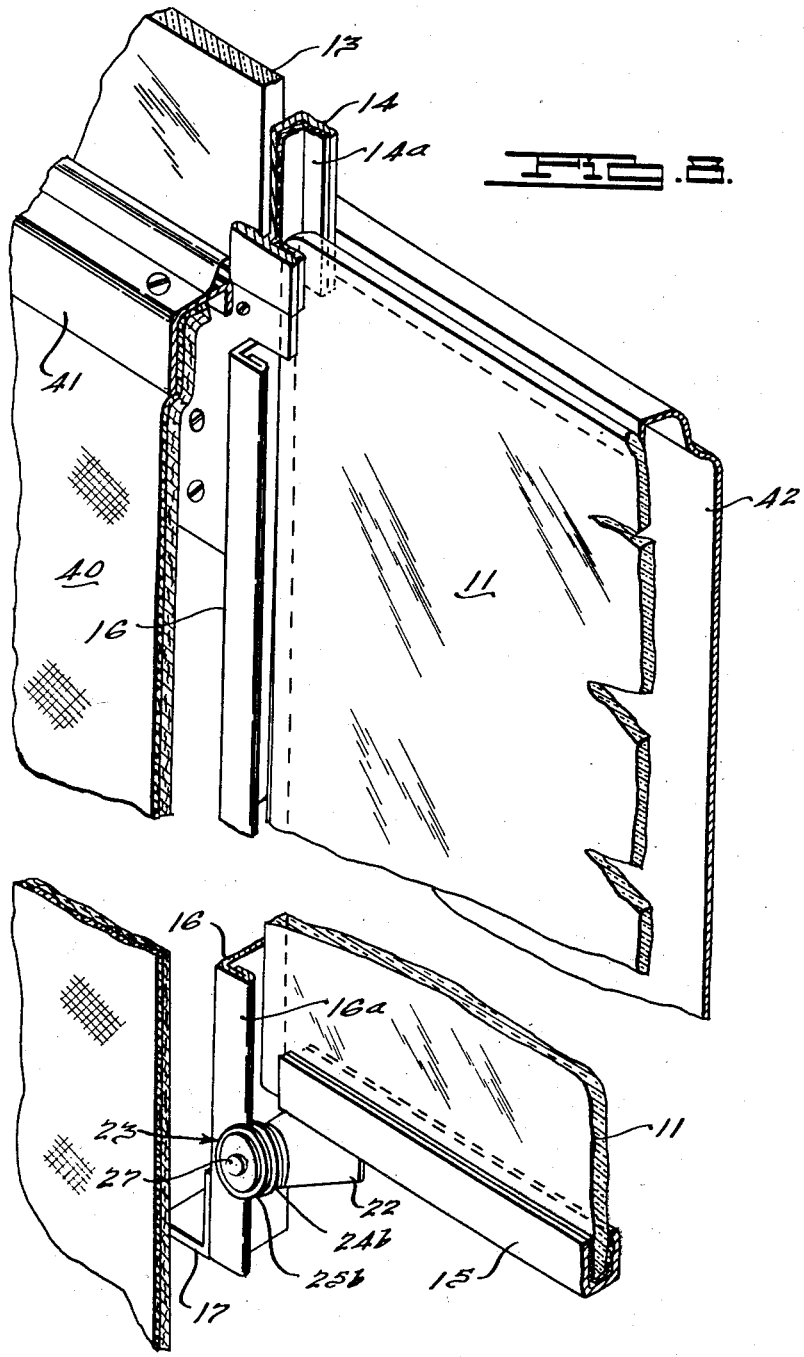
INVENTOR.
John H. Roethel.
BY
Gray & Smith
ATTORNEYS Patented Aug. 24, 1948

2,447,990

UNITED STATES PATENT OFFICE 2,447,990

WINDOW GUIDE FOR VEHICLE BODIES

John H. Roethel, Detroit, Mich., assignor to Marvel Equipment Corporation, Detroit, Mich., a corporation of Michigan Application September 17, 1943, Serial No. 502,779

3 Claims. (Cl. 296—44.5)

This invention relates to window control mechanism and particularly mechanism for controlling the operation of glass or transparent panels or the like of vehicles, especially automobile bodies, an object of the invention being to provide an improved mechanism which is compact, relatively simple in construction and economical to manufacture, requires a minimum of space in the body, eliminates considerable frictional resistance to the movement of the window panel, is capable of being easily assembled and adjusted properly within the body, and is adapted for use without material changes to various types of windows.

A further object of the invention is to provide a window panel control mechanism embodying improved means of simple and efficient construction for guiding the window panel within the well of a vehicle body, especially an automobile body, the improved construction being such that the panel is guided with a minimum of frictional resistance to its travel while the guide means in the well is substantially noiseless or constructed in such manner as to avoid chattering or vibrating noises during operation of the vehicle and at the same time is easy to install and adjust for efficient operation.

Another object of the invention is to provide a window guide mechanism embodying fixed upright guides within the window well each formed of an angle having a single guide flange extending longitudinally within the well and adapted to be engaged by a guide device secured to the lower edge of the window panel, such as a rotatable shoe or member grooved to embrace the guide flange and capable of being maintained at all times in proper guiding relation to the flange.

A further object of the invention is to provide an improved window guide embodying a rotatable roller or disk-like device adapted to travel with a minimum of frictional resistance against a fixed upright guide within the window well, the roller being formed of non-metallic material which will be relatively noiseless in operation capable of flexing, bending or yielding somewhat laterally so as to accommodate variations especially where the roller and fixed guide do not line up accurately or are not in the same plane after the parts have been assembled in the vehicle body.

Still another object of the invention is to provide an improved window guide embodying a roller grooved to embrace a guide track or guide flange formed on a fixed upright guide in the window well, the roller comprising a plurality of independently rotatable disks of non-metallic material, at least one thereof peripherally engaging the guide to afford bearing contact, the preferred construction being such that the disks or at least one thereof will flex, bend or compress in any direction to accommodate variations or misalignment of the roller and guide and in which the roller may be adjusted longitudinally to position the same properly during assembly or for the purpose of take-up to compensate for wear.

A further object of the invention is to provide an improved window guide embodying a rotatable roller comprising spaced disk-like portions embracing the guide flange of a fixed upright guide within the window well, one of the disk portions being adapted to have peripheral contact with the base of the guide at one side, the construction being such that the roller and guide will cooperate noiselessly and with a minimum of frictional resistance during operation and will be capable of self-accommodation for variations in construction.

This application is a continuation-in-part of my application Ser. No. 491,140, filed June 17, 1943, now abandoned.

Other objects of this invention will appear in the following description and appended claims, reference being had to the accompanying drawings forming a part of this specification wherein like reference characters designate corresponding parts in the several views.

Fig. 1 is a fragmentary inner side elevation of an automobile door, such as a front door, having installed therein a window guide embodying the present invention.

Fig. 2 is an enlarged fragmentary side elevation of one of the guide devices such as the front guide device shown in Fig. 1.

Fig. 3 is an enlarged fragmentary side elevation of the rear guide device illustrated in Fig. 1.

Fig. 4 is a section taken substantially through lines 4—4 of Fig. 2 looking in the direction of the arrows.

Fig. 5 is a view similar to Fig. 4 illustrating another embodiment of a roller guide device.

Fig. 6 is a view similar to Fig. 4 illustrating a further embodiment of a roller guide device.

Fig. 7 is a view similar to Fig. 4 illustrating still another embodiment.

Fig. 8 is an enlarged fragmentary perspective view illustrating the installation of the sliding window and guide structure within the door shown in Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein I have illustrated, by way of example, certain embodiments of the present invention, there is shown at 10 a front door of an automobile body comprising a door frame of any suitable construction formed with a main window opening which is adapted to be closed by means of a vertically slidable glass or other transparent panel 11. In the present instance the door frame is constructed so as to receive in the main window opening a wing type panel 13 pivoted in conventional manner about an up and down axis intermediate its front and rear edges so as to swing laterally. It will be understood that the present invention may be utilized in connection with any of the windows of an automobile body and, in addition, may be used generally in connection with various window structures of vehicles or the like.

The sliding panel 11 is mounted within the window opening in glass run channels 12. The panels 11 and 13 are separated by means of a vertical partition bar 14 which either may be fixed within the window opening, as in the present instance, or attached to the edge of the panel 11 to slide therewith.

Secured to the lower edge of the sliding panel 11 is a retainer channel 15 to which the window regulator is adapted to be attached. Mounted within the window well of the door, which is formed between the inner and outer door or body panels, are two fixed upright guides 16, each being secured at its lower end within the well by a bracket 17 secured to the inner door panel. The upper end of the front guide 16 is attached to a fixed bracket 18 and the upper end of the rear guide 16 is attached to a fixed bracket 19.

The window panel 11 is provided with front and rear guide devices 20 and 21 cooperable with the upright guides 16 within the window well. Referring to Figs. 2 and 4, the front guide device is carried by an angle bracket 22 having its top horizontal flange 22a secured, as by spot welding, to the bottom of the glass retainer channel 15. This guide device includes a roller 23 which in the present instance is of composite construction comprising a pair of spaced inner and outer disk-like members 24 and 25 which in this embodiment are of the same diameter. The members 24 and 25 are separated and held in spaced relation by means of a disk-like member 26 of considerably smaller diameter. The disk members 24, 25 and 26 are mounted to rotate individually upon a cylindrical stud 27 which may be in the form of a shoulder rivet secured by riveting at its inner end to the bracket 22. The opposite end of the stud 27 has a flat head engaging a metallic washer 28 which in turn engages the outer face of the disk member 25.

The fixed upright guide 16 in this embodiment is in the form of a metal angle comprising a track or guide flange 16a extending at right angles to the base of the member. The guide flange 16a is of double thickness having its outer portion folded back upon itself at 16b so as to provide an outer curved edge for engagement with the central disk member 26 of the guide roller. It will be noted that the disk portions 24 and 25 of the roller are spaced apart to form a groove 29 of a depth to embrace the major depth of the guide flange 16a, this guide flange having its portion of double thickness preferably wider than the depth of the groove 29, as illustrated in Fig. 4.

The disk portions 24, 25 and 26 are preferably formed of a non-metallic material which will not only have substantially noiseless engagement with the guide flange 16a of the guide 16 but will be capable of yielding or compressing slightly both longitudinally and laterally thereby to accommodate variations and to provide a take-up for such variations or wear. These disk members have been satisfactorily formed of leather although it will be understood that material having equivalent characteristics may be utilized. In the embodiment of Fig. 4 the outer curved edge of the guide flange has contact with the peripheral edge of the center guide disk 26 so as to cause the roller to turn during up and down movement of the window panel 11. It is preferred that the inner and outer disk portions 24 and 25 have slight clearance with the side faces of the guide flange portions 16a and 16b.

In the present embodiments of the invention the rear guide device 21 comprises a bracket 30, adapted to carry the roller device 23, which is mounted for longitudinal adjustment upon an angle bracket 31 having its top horizontal flange 31a secured, as by spot welding, to the bottom of the glass retainer channel 15. The bracket 30 is provided with two longitudinal slots 32 through which extend hexagon head adjusting screws 33 threaded into tapped holes in the vertical flange of the bracket 31. By loosening these screws the bracket 30 and its roller device 23 may be readily adjusted longitudinally upon the bracket 31. Thus, after the window panel 11 has been installed with the roller devices 23 embracing the guide flanges of the guides 16, the roller device 21 may be adjudged longitudinally so as to obtain the proper contacting engagement between the central portion of each roller and the edge of the guide flange in the manner illustrated in Fig. 4.

In the embodiment of Fig. 5 there is illustrated a roller device of somewhat modified construction which may be used in place of each of the roller devices 23 illustrated in the embodiment of Figs. 2, 3 and 4. In this instance the inner and outer disk members 24b and 25b are of different diameters and the central disk member 26b is somewhat thicker in order to space the disks 24b and 25b a slightly greater distance apart. The three disk members of Fig. 5 are in like manner individually rotatable upon the cylindrical stud 27. The fixed upright guide 216 in this embodiment is also in the form of a metallic angle mounted in the same manner as the guide 16 and having an inwardly directed guide flange of two thicknesses of metal. However, the flange 216a is bent back upon itself outwardly to provide a parallel portion 216b spaced somewhat from the portion 216a in order to provide a curved contacting edge of increased radius adapted, if desired, to engage the central disk portion 26b of the guide roller. The portion 26b may be of slightly less thickness to enable use of the roller of Fig. 5 with the guide 16 without having excessive clearances between the sides of the roller and the sides of the guide flange of Fig. 4. A thin metal washer may be interposed between the disk 24b and bracket 22 or 30 so as to reduce friction, and similarly located washers may be used in the embodiments of Figs. 4 and 6. In preferred practice when initially installed, the roller device of Fig. 5 may normally have rolling contact only through the periphery of the disk 24b with the central disk portion 26b slightly spaced from the guide flange. In case of slight wear of the disk portion 24b, the part 26b will then engage and have rolling contact with the guide flange. These spacer disks or washers 26b at all times assist in holding the window panel against any material displacement longitudinally or cocking in its plane. It is preferred that the portions 24b and 25b have slight clearance with respect to the side faces of the guide flanges 216a and 216b, and also that the parts 24b, 25b and 26b be made of leather or equivalent material or surfaced with noiseless material so as to be both flexible and compressible to a slight extent.

Referring to the embodiment of Fig. 6, there is here shown a roller device which may be substituted for each of the devices 23 in the embodiment of Figs. 2 and 3. In this instance the disk portions 24a and 25a are of the same and larger diameter than the central spacer portion 26a so as to provide a deeper groove between the parts 24a and 25a. Each guide device 116, which may replace the guide devices 16 of the previous embodiment, comprises a metallic base 116 formed with a reversely bent flange 116a of double thickness adapted to extend into the groove between the roller portions 24a and 25a. The latter have rolling contact against the base of the guide 116 at opposite sides of the guide flange which preferably is initially spaced slightly from the central spacer disk portion 26a. As in the previous embodiments, there is preferably a slight initial clearance between the disk portions 24a and 25a and the sides of the guide flange 116a.

Referring to the embodiment illustrated in Fig. 7, there is provided in this instance a roller, adapted to be mounted on either of the brackets 22 or 30, which comprises a single disk 34 rotatable upon a stud 35, which may be a shoulder rivet secured to the bracket 22 or 30. Metallic washers are mounted upon the shank of the stud at opposite faces of the disk 34. The fixed upright guide in this instance is shown as a narrow channel 36 mounted within the window well in the same manner as the guides 16. The roller or disk 34 has rolling contact upon the bottom of the channel and is preferably slightly spaced from the inner surfaces of the spaced flange portions of the channel 36, as illustrated in the drawing. The disk 34 is of non-metallic material, such as leather, which may be one piece or laminated.

One of the important features of the roller guide devices of the various embodiments resides in the fact that the disk members provide substantially noiseless engagement with the guides in order to avoid objectionable vibratory noises or chattering during operation of the vehicle while at the same time having sufficient rigidity to hold the window panel in properly guided positions. However, the material is such that the rollers or at least portions thereof may compress or distort slightly in order to compensate, for example, for misalignment of the rollers and guide flanges such as in cases where, after assembly, the roller portions or the grooves thereof are not exactly parallel or coplanar with the guide flanges. For example, the rollers will still operate even if the guide flanges are slightly cocked and do not extend accurately at right angles to the axis of the studs 27 or 35. In cases of misalignment or lack of parallelism between the rollers and guide flanges, the outer disk portions 25, 25a or 25b as also the washers 28 may give or yield slightly so as to accommodate these inaccuracies without, however, impairing the operation of the parts. It will also be noted that the depth of penetration of the guide flanges within the grooves of the rollers or the depth of penetration of the roller 34 within the channel 36 is such as to prevent the rollers from jumping off the guides, especially when the door is slammed.

Fig. 8 illustrates a suitable assembly of the guide structure within the automobile door shown in Fig. 1 utilizing, for example, guide rollers 23 of the construction illustrated in Fig. 5. The fixed guide bar 14 is of channel construction providing a vertical groove or glass run for the front edge of the window panel, this groove having a lining 14a of felt or other equivalent material so as to cooperate with the rear glass run channel 12 in guiding the window panel within the window opening. The guide 16 is mounted within the window well in such manner that the guide flange 16a is offset laterally with respect to the guide 14 so that the adjacent upright edge of the window panel 11 will overlap but travel to one side of the guide flange 16a without engagement therewith in any position of the window panel. The bracket 22, secured to the bottom of the retainer channel 15, is offset laterally so as to position the roller 23 laterally with respect to the plane of the window panel with the roller disk 24, 24a or 24b lying between the planes of the guide flange and panel. A similar construction is provided at the rear end of the window panel in respect to the bracket 21. In this view the inner trim panel is shown at 40 and the usual garnish molding at 41. Since the edge of the window glass may travel rather close to the base of the guide 16 it is desirable, under such circumstances, to have the separator disk or washer 26b, 26 or 26a since it will act as a stop to limit displacement of the glass in its plane or sufficiently to permit the glass to contact the bottom of the guide.

A suitable window regulator is employed for raising and lowering the window panel 11 and in the present instance there is illustrated a window regulator in part similar to that shown and described in my copending abandoned application Serial No. 491,141.

As illustrated in Fig. 1, the window regulator comprises two crossed and intersecting swinging arms 45 and 46. The arm 45 extends through the arm 46 and is pivoted thereto at 47 at the locality of the crossing of the two arms. A spiral counterbalancing spring 48 is mounted at the juncture of the two arms. Secured to the inner end of the arm 45 is a bell crank lever 49, the lever and arm 45 having a common pivotal mounting 50 upon the inner door panel 42 of the door. Pivotally connected to the outer end of the bell crank lever 49 is a push and pull link 51 which in turn is pivoted to a swinging arm 52 pivoted at 53 to a mounting plate 54 secured to the inner door panel. The inner end of the arm is formed with a gear segment 58 meshing with a driving pinion on a handle shaft 59 operated in the usual manner by means of a crank handle. Upon operating the crank handle to lower the window panel 11 the arm 52 will be swung in the direction of the arm thereby shifting the link 51 and outer arm of the bell crank lever 49 to the right, as shown in dotted lines in Fig. 1, and swinging the arms 45 and 46 to the positions shown in dotted lines, the arms passing each other as the window is raised and lowered. The arms 45 and 46 may have the usual connections at their outer ends through the medium of studs or the like with brackets 55 and 56 secured to the glass retainer channel 15. The inner end of the swinging arm 46 has a sliding connection in a horizontal slot 57 in the inner door panel 42.

Assembling of the window panel into the window well is facilitated in accordance with the present embodiments of the invention. When the panel is inserted through the slot at the lower edge of the window opening, it is not necessary at this time to run the rollers onto the guide flanges, which often is a difficult operation. Instead the screws 33 may be loosened and the bracket 36 shifted away from the guide after which the window panel is installed with the rollers free of the guide flanges. The rollers may then be shifted laterally into position opposite the guide flanges and the rear roller adjusted longitudinally to properly position both rollers on the flanges. It is thus possible to engage and completely disengage the rollers from the flanges, while the panel is in the well, since the length of the slots 32 is sufficient to permit the rear roller to be backed completely off from its guide flange. This same feature also applies to the embodiment of Fig. 7 in which the rear roller may be backed out of the channel.

I claim:

1. A guide for a window panel shiftable into and out of a window well, comprising an upright guide having a guide flange extending in the direction of the plane of the panel within the well, said flange being return bent to provide parallel flange portions, a roller mounted on the lower edge of the panel at one side of the plane thereof, said roller having spaced flexible disk-like portions embracing said flange portions and at least one thereof having rolling engagement with a surface at one side of the flange.

2. A guide for a window panel shiftable into and out of a window well, comprising an upright guide having a guide flange extending in the direction of the plane of the panel within the well, said flange being return bent to provide parallel flange portions, a roller mounted on the lower edge of the panel at one side of the plane thereof, said roller having spaced flexible disk-like portions embracing said flange portions and one thereof being of greater diameter than the other so as to have rolling engagement with a surface at one side of the flange.

3. A guide for a window panel shiftable into and out of a window well, comprising an upright guide adapted to be mounted in the well and having a guide flange extending in the direction of the plane of the panel at one side thereof, said flange being return bent to provide parallel flange portions, a roller mounted on the lower edge of the panel comprising spaced leather-like washers or disks embracing said flange portions and one of a diameter to have rolling engagement with a surface adjacent the base of the guide flange.

JOHN H. ROETHEL.

REFERENCES CITED

The following references are of record in the file of this patent:

UNITED STATES PATENTS

| Number | Name | Date |
|---|---|---|
| 38,387 | Hatfield | May 5, 1863 |
| 422,305 | Lane | Feb. 25, 1890 |
| 482,530 | Shreffler, Jr. | Sept. 13, 1892 |
| 1,713,088 | Nicholson | May 14, 1929 |
| 1,827,983 | Haskins et al. | Oct. 20, 1931 |
| 1,892,731 | Lakin et al. | Jan. 3, 1933 |
| 2,081,896 | Axe | June 1, 1937 |
| 2,114,235 | Page | Apr. 12, 1938 |
| 2,168,242 | Roethel | Aug. 1, 1939 |
| 2,214,328 | Haberstump | Sept. 10, 1940 |
| 2,234,426 | Cooley | Mar. 11, 1941 |
| 2,236,449 | Roethel | Mar. 25, 1941 |
| 2,283,002 | Floraday | May 12, 1942 |
| 2,379,924 | Roethel | July 10, 1945 |

FOREIGN PATENTS

| Number | Country | Date |
|---|---|---|
| 240,349 | Great Britain | Oct. 1, 1925 |